United States Patent [19]

Calcote et al.

[11] Patent Number: 4,891,339
[45] Date of Patent: Jan. 2, 1990

[54] PROCESS AND APPARATUS FOR THE FLAME PREPARATION OF CERAMIC POWDERS

[75] Inventors: Hartwell F. Calcote, Princeton; William Felder, Lawrenceville, both of N.J.

[73] Assignee: AeroChem Research Laboratories, Inc., Princeton, N.J.

[21] Appl. No.: 113,215

[22] Filed: Oct. 23, 1987

[51] Int. Cl.$^4$ .................. C04B 35/56; C04B 35/58
[52] U.S. Cl. ............................................ 501/87; 501/88; 501/96; 501/97; 423/344; 423/346; 423/290; 423/291
[58] Field of Search .................. 501/87, 88, 96, 97; 423/344, 346, 290, 291

[56] References Cited

U.S. PATENT DOCUMENTS

| | | | |
|---|---|---|---|
| 3,334,967 | 8/1967 | Bourdeau | 423/291 |
| 3,520,740 | 7/1970 | Addamiano | 423/346 |
| 3,565,674 | 2/1971 | Roland et al. | 423/344 |
| 3,755,541 | 8/1973 | Strepkoff | 423/346 |
| 3,839,542 | 10/1974 | Chase | 423/346 |
| 3,979,500 | 9/1976 | Sheppard et al. | 423/291 |
| 4,017,587 | 4/1977 | Ditter et al. | 423/291 |
| 4,122,155 | 10/1978 | Druchazka et al. | 423/344 |
| 4,181,751 | 1/1980 | Hall et al. | 423/344 |
| 4,565,747 | 1/1986 | Nakae et al. | 423/290 |
| 4,676,966 | 6/1987 | Endo et al. | 501/88 |

Primary Examiner—Mark L. Bell
Assistant Examiner—David M. Brunsman
Attorney, Agent, or Firm—Louis E. Marn

[57] ABSTRACT

There is disclosed a novel process and apparatus for continuously producing very fine, ultrapure ceramic powders from ceramic precursor reactants in a self-sustaining reaction system in the form of a stabilized flame thereof to form ceramic particles and wherein the thus formed ceramic particles are collected in the absence of oxygen.

15 Claims, 3 Drawing Sheets

PROCESS AND APPARATUS FOR THE FLAME PREPARATION OF CERAMIC POWDERS

This invention was made with Government support under Contract No. DAAG29-84-C-0023 awarded by the U.S. Army Research Office. The Government has certain rights in this invention.

BACKGROUND OF THE INVENTION

(1) Field of the Invention

This invention relates to a process and apparatus for producing ceramic powders, and more particularly to an improved process and apparatus for producing very fine, ultrapure, uniform, spherical, loosely agglomerated ceramic particles.

(2) Description of the Prior Art

The generation of fine, pure, uniform, spherical, loosely agglomerated particles is of intense interest because of their recently recognized properties as suitable starting materials for producing high performance, dense ceramic articles. Densified bodies produced from such powders are predicted to be very strong and to have significantly enhanced property reproducibility. Silicon carbide (SiC) and silicon nitride ($Si_3N_4$) are two ceramic materials currently considered highly suitable for use in advanced military and civilian engines.

The direct synthesis of such ceramic powders from gas phase reactants has been achieved using lasers, RF plasma heating systems and heated flow tubes. The first two methods have the advantage over other methods, such as solid phase synthesis and chemical vapor deposition, of avoiding contact of the reactants or products with hot walls (a source of contamination). The latter two methods suffer from non-uniformities in the size of the reaction zone resulting in the production of undesirable wide particle size distribution, agglomeration, etc. The first system is difficult to scale from the laboratory to a production facility.

The use of flame systems to produce ceramic materials has been limited generally to producing oxide powders, such as silicon dioxide ($SiO_2$) and titanium dioxide ($TiO_2$) in which the metal containing compound, such as a metal chloride, is added to a hydrocarbon air or hydrogen-air flame, i.e. an already existing flame. A flame system is disclosed in U.S. Pat. No. 4,017,587 to Ditter et al. for the manufacture of amorphous boron carbide by igniting a static gaseous mixture of acetylene and diborane.

OBJECTS OF THE PRESENT INVENTION

It is an object of the present invention to provide an improved process and apparatus for the production of ceramic particles of uniform particle size distribution.

Another object of the present invention is to provide an improved process and apparatus for the production of ceramic particles of uniform particle size distribution, uniform composition, and narrow particle size distribution.

Still another object of the present invention is to provide an improved process and apparatus for the production of ceramic particles of ultrafine and uniform particle size distribution.

Yet another object of the present invention is to provide an improved process and apparatus for the production of ceramic particles of uniform particle size distribution in a continuous self-sustaining chemical reaction.

A further object of the present invention is to provide an improved process and apparatus for the production of ceramic particles of uniform particle size distribution under conditions to substantially minimize contamination.

Yet a further object of the present invention is to provide an improved process and apparatus for the production of ultrapure ceramic powders which is readily scalable from the laboratory to a production facility.

SUMMARY OF THE INVENTION

These and other objects of the present invention are achieved in a novel process and apparatus for continuously producing very fine, ultrapure ceramic particles in a self-sustaining reaction system of a steady state flame to form ceramic particles and wherein the thus formed ceramic particles are collected in the absence of oxygen.

BRIEF DESCRIPTION OF THE DRAWINGS

A better understanding of the present invention may be obtained by reference to the following detailed description when taken with the accompanying drawings, wherein.

DETAILED DESCRIPTION OF THE INVENTION

Figure 1:
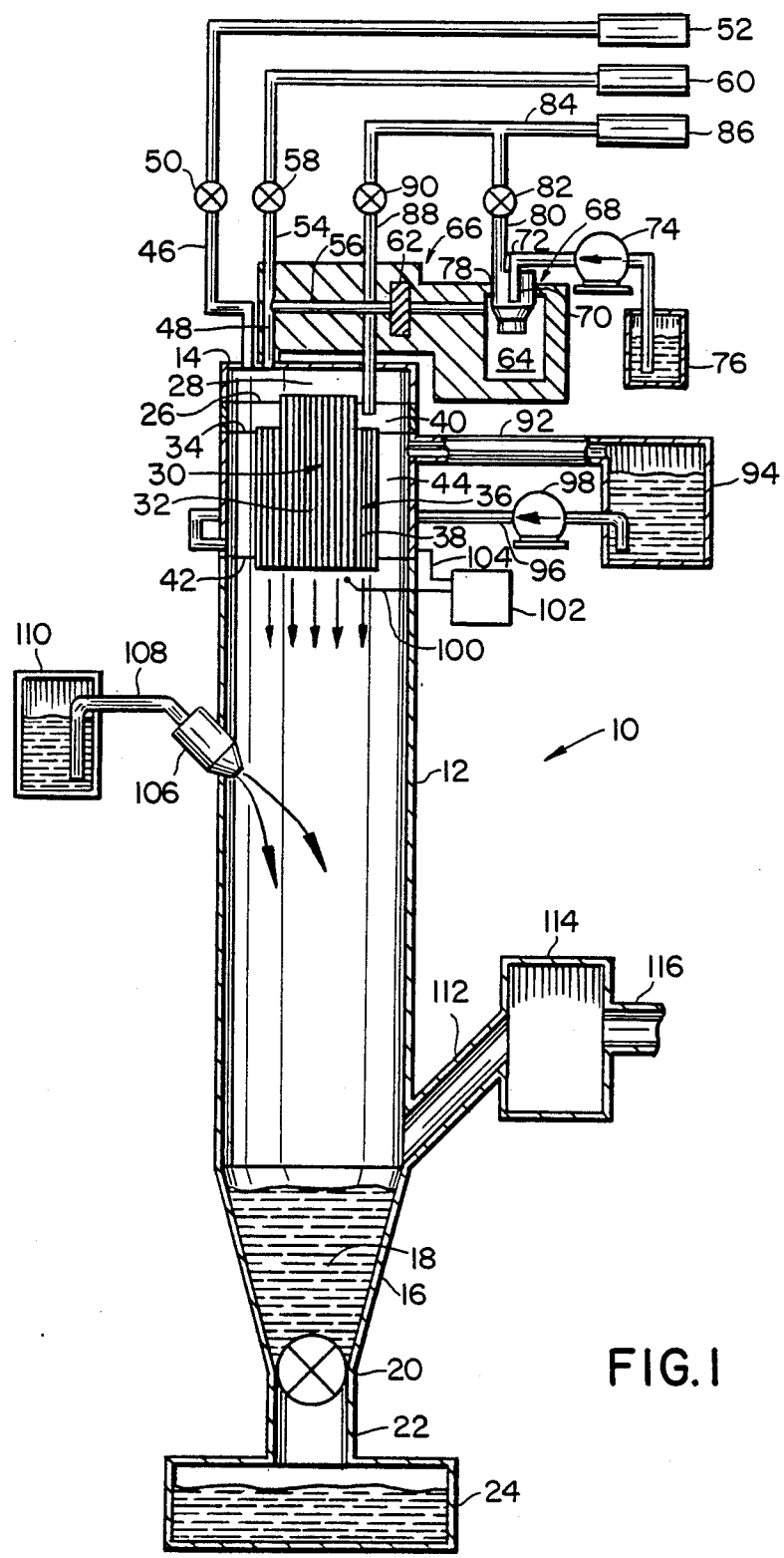
FIG. 1 is cross-sectional schematic diagram of the process and apparatus of the present invention.

To facilitate a description of the process and apparatus of the present invention, the present invention will be described in the context of producing silicon nitride from silane, hydrazine and ammonia in accordance with the following formulae:

$$3SiH_4 + 4NH_3 \rightarrow Si_3N_4 + 12H_2 \quad (1)$$

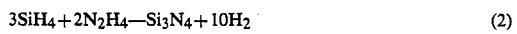

$$3SiH_4 + 2N_2H_4 \rightarrow Si_3N_4 + 10H_2 \quad (2)$$

Referring now to the drawings, there is illustrated a reactor assembly, generally indicated as 10, comprised of a vertically-disposed cylindrically-shaped wall member 12 enclosed at an upper end by a circularly-shaped top wall member 14 and having a conically-shaped member 16 mounted to a lower end portion thereof defining a product receiving zone 18 and provided via a valve 20 in fluid communication with a product conduit 22 to product receiving tank 24.

In the upper portion of the reactor assembly 10, there is provided a disc-shaped member 26 parallelly-disposed to and below the top wall 14 defining a reactant mixing chamber 28. Mounted to and depending vertically downwardly from the disc-shaped member 26, there is provided a tube bundle, generally indicated as 30, including a plurality of tube members 32 of an internal diameter of about 0.08 mm. Disposed below and in a plane parallel to the disc-shaped member 26, there is mounted within the reactor assembly 10, a disc-shaped member 34 to which is mounted a tube bundle, generally indicated as 36, annularly-arrayed about the tube bundle 30 and comprised of a plurality of tube members 38 and defining an inert gas chamber 40 with the member 26. Above lower end portions of the tube members 32 and 38 and parallelly-disposed to the disc-shaped member 34, there is mounted within the reactor assembly 10 a disc-shaped member 42 defining with the outer portion of the tube bundle 38 an internal heat transfer chamber 44, as more fully hereinafter described.

To the top wall 14 of the reactor assembly 10, there are mounted inlet conduits 46 and 48 in fluid communication with the reactant mixing zone 28. The inlet conduit 46 is provided with a valve 50 and is in fluid communication with storage vessel 52, such as for silane ($SiH_4$). The inlet conduit 48 is connected to a conduit 54 and a conduit 56. The conduit 54 is provided with a valve 58 and is in fluid communication with storage vessel 60, such as for ammonia ($NH_3$). The conduit 56 is in fluid communication via a filter 62 with a vaporizing chamber 64 disposed in a insulated and heated block assembly, generally indicated as 66.

The upper portion of the vaporizing chamber 64 is provided with an atomizer assembly, generally indicated as 68, including an aspirating tube 70 in fluid communication by conduit 72 including a pump 74 with a storage vessel 76, such as for hydrazine ($N_2H_4$) About the aspirating tube 70, there is mounted a nozzle 78 in fluid communication by a conduit 80 including a valve 82 via a conduit 84 to an inert gas storage vessel 86, such as for an inert gas. Mounted through the top wall member 14 and the disc-shaped member 26 to the inert gas chamber 40, there is provided an inlet conduit 88 having a valve 90 in fluid communication with inert gas storage vessel 86 via the conduit 84.

Mounted to an intermediate portion of the top wall 14 of the reactor assembly 10 and in fluid communication with the internal heat transfer zone 44 is an upper conduit 92 in fluid communication with a storage vessel 94 or a heat transfer fluid and a lower conduit 96 including a pump 98. Positioned below the ends of the tube bundles 30 and 36, there is provided an ignitor lead 100 connected to an ignitor assembly 102 having a return lead 104 mounted to wall 12 of the reactor assembly 10. Extending into the reactor assembly 10 and below the end portions of the tube bundles 30 and 36, there is mounted a spray nozzle 106 having a conduit 108 in fluid communication with a pressurized storage tank 110. A gaseous outlet conduit 112 is mounted to the wall member 12 above about the lower end portion thereof in fluid communication with a chamber 114 and a conduit 116.

The process of the present invention is to effect a self-sustaining reaction in a stabilized flame of ceramic precursor reactants to form very fine, (0.01 to 0.5 microns) ultrapure, uniform, spherical, loosely agglomerated ceramic particles suitable for the preparation of advanced ceramic devices or the like. The self-sustaining reaction which supports a stabilized flame is the synthesis medium, i.e. no external energy source is required once ignition of the reaction system has been accomplished. The ceramic particles to be prepared in accordance with the present invention include silicon nitride, silicon carbide, boron nitride, boron carbide, and the like, and are exemplified by the following reactions:

| | | | Reaction Temperature, K |
|---|---|---|---|
| (3) $SiH_4 + 1/2C_2H_2$ | — | $SiC + 5/2H_2$ | 2045 |
| (4) $SiH_4 + 1/2C_2N_2$ | — | $SiC + 2H_2 + 1/2N_2$ | 2110 |
| (5) $3SiH_4 + 4NH_3$ | — | $Si_3N_4 + 12H_2$ | 1590 |
| (6) $3SiH_4 + 2N_2H_4$ | — | $Si_3N_4 + 10H_2$ | 1925 |
| (7) $1/2B_2H_6 + 1/2N_2H_4$ | — | $BN + 5/2H_2$ | 2446 |
| (8) $2B_2H_6 + 1/2C_2H_2$ | — | $B_4C + 13/2H_2$ | 1104 |

In order for any reaction system to be self-sustaining, sufficient energy must be released to raise the temperature of the products so that feedback of heat and reactive intermediate species from the products to the reactants will maintain the reaction front against the flow of reagents thereby to form a stabilized flame. A flat, one-dimensional flame may be produced above a porous plate or multitubular burner through which premixed reactants are introduced and at an appropriate linear flow rate of reactants (called the "burning velocity"), the flame will remain stationary above the plate. Considerable leeway in flow rates is possible because of stabilization by heat transfer to the flameholder. The primary reaction zone is usually very thin, of from 0.05 to 0.5 cm. typically 0.1 cm for a hydrocarbon/air mixture at 1 atm., corresponding to a flow time of about 1 ms. The reaction maintains itself by transport of heat and chemical intermediates (especially hydrogen atoms in hydrocarbon combustion) from the product side of the reaction zone to the reactant side.

The type of flame in the present invention is unusual in that solid particles comprise a large mass fraction of the products and their heat content is largely unavailable for transport to the reactants except by radiation. On the other hand, the gaseous product is generally hydrogen, which has a very high diffusion coefficient which increases the stability of the flame. The thin reaction zone of a flat flame at atmospheric pressure or higher pressures has a major advantage for producing ceramic particles in that all of the reactants experience like temperature history, and thus small particles are produced with uniform properties.

Any proposed reaction system for a self-sustaining reaction system with a stabilized flame may be initially evaluated by performing a thermodynamic equilibrium calculation to determine whether the heat released in the reaction will significantly raise the temperature of the products, as exemplified by reactions (3) to (8) above. The conversion efficiency of silane or diborane to their respective carbides or nitrides is predicted to be 100, 100, 100, 69, 100, and 86% for reactions (3) to (8), respectively, when the reactants are in stoichiometric proportions at 1 atm. Conversions of 100% of silane or diborane can be obtained thermodynamically for all of the reactant mixtures by operating with a non-stoichiometric reagent mixture or by dilution with an inert gas, e.g. argon or nitrogen, which lowers the flame temperature. The thermodynamic effects of reagent ratio, total pressure, and reaction temperature for these reactions may be readily investigated by equilibrium calculation.

Figure 2:
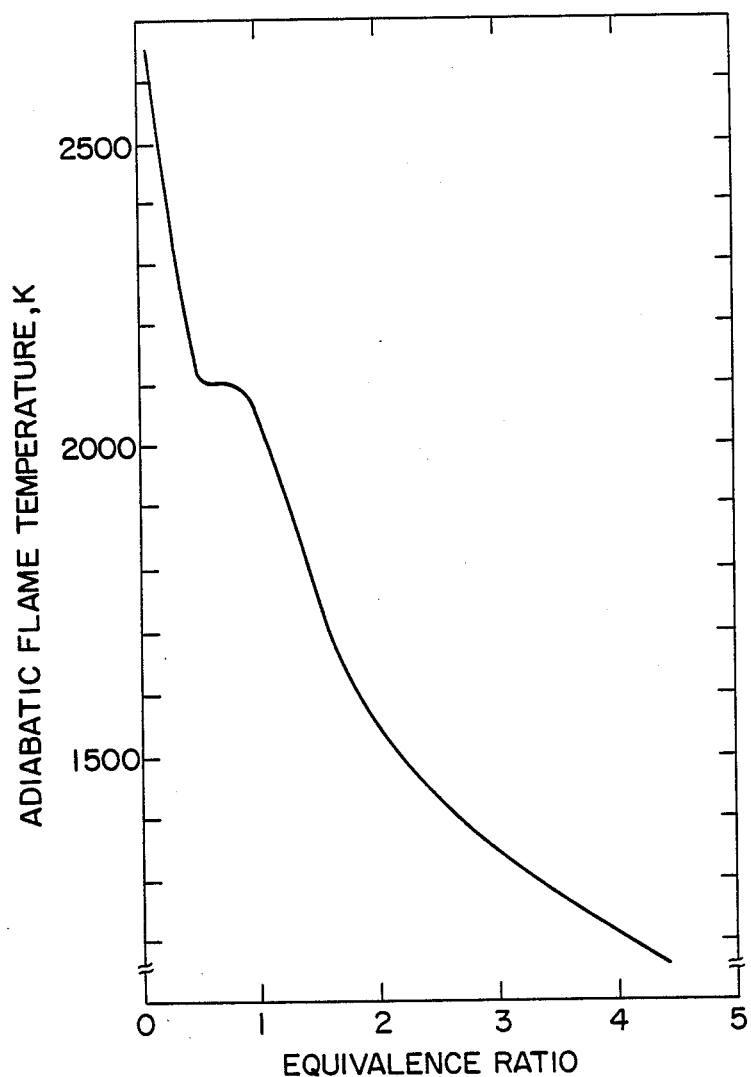
FIG. 2 is a graph illustrating variations of the adiabatic flame temperature with equivalence ratio of one reactant system.

The effect of varying the equivalence ratio of the reactants on the adiabatic flame temperature of Reaction (3) at 1 atm. is illustrated in FIG. 2. Equivalence ratio, $\phi$, is defined as the mole ratio of the input reagents divided by the mole ratio to produce the defined product, i.e., the stoichiometric ratio. Thus, when $[SiH_4]/[C_2H_2]=2$, the reagent ratio is "stoichiometric"

and the equivalence ratio is 1.0. For the conditions of FIG. 2, all of the silane and acetylene are converted to solid products and $H_2$ (with about 0.22% H atoms and 0.04% $SiH_2$ near $\phi=1.0$). At $\phi=1.0$, SiC is the sole solid product. At $\phi$ greater than 1.0, SiC and elemental silicon are produced. For equivalence ratios less than 1.0, the calculated increase in the adiabatic flame temperature results from the exothermic decomposition of excess acetylene into graphite and hydrogen. Variations in reaction pressure from 0.1 to 1.0 atm. have negligible effect on the yield of solid SiC, C, and Si, or on the adiabatic flame temperature.

The effect of variations in the calculated adiabatic flame temperature on the yield of SiC from Reaction (3) at $\phi=1.0$ at lower than adiabatic reaction temperatures when heat is removed from the system by radiation or conduction to a burner resulted in quantitative production of SiC at reaction temperatures from 500 K. to the adiabatic flame temperature at the evaluated pressures.

Figure 3:
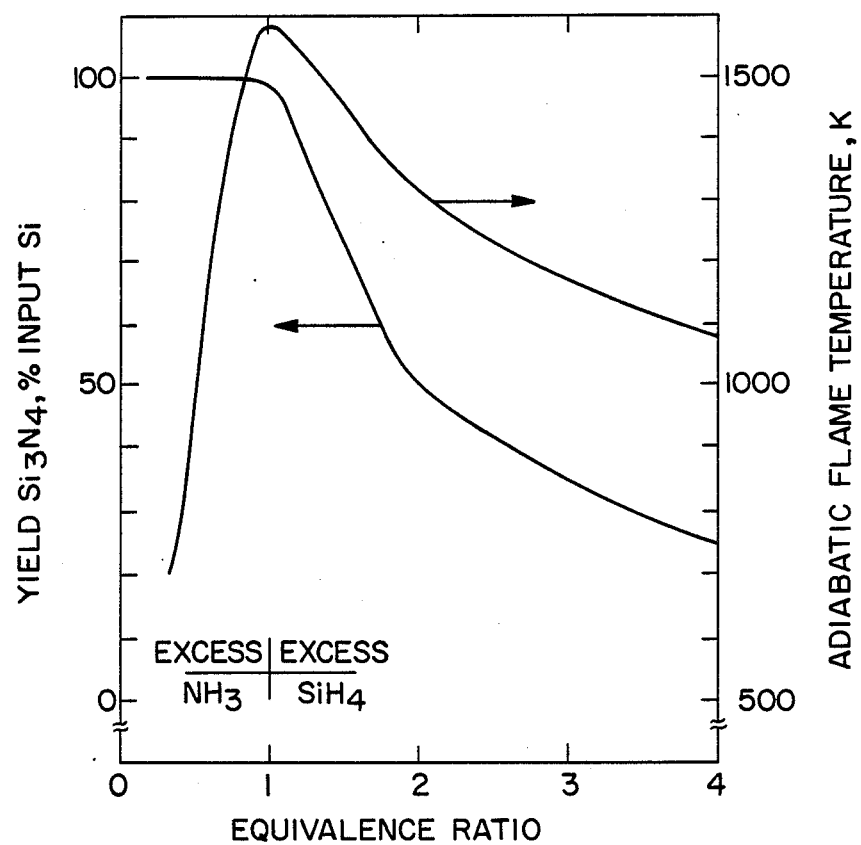
FIG. 3 is a graph illustrating variations of yield and the adiabatic flame temperature with equivalence ratio of another reactant system.

The effect of varying the equivalence ratio of the reactants of Reaction (5) on the adiabatic flame temperature and $Si_3N_4$ yield is shown in FIG. 3. At 1 atm, all of the silane is converted to solid products and $H_2$. At equivalence ratios less than 1.0, $Si_3N_4$ is the sole solid produced. At equivalence ratios greater than 1.0, silicon is also produced. At an equivalence ratio of 1.0, variations in reaction pressure from 0.1 to 10 atm. have negligible effect on the yield of solid $Si_3N_4$ or on the adiabatic flame temperature; 99% of the reactants are converted to solid $Si_3N_4$ and $H_2$.

The effect of variations in reaction temperature on the yield of $Si_3N_4$ from Reaction (5) at other than adiabatic reaction temperatures resulted in quantitative production of $Si_3N_4$ at all reaction temperatures from 500 K. to adiabatic flame temperature at the evaluated pressures tested.

As hereinabove discussed, the present invention will be described in the context of the flame synthesis of silicon nitride powder in accordance with Equations (5) and (6) above. It will be understood that the particular end user requirements will dictate the chemical and physical properties including composition, impurity content, particle size, particle size distribution, degree and strength of agglomeration, surface area, degree of crystallinity, phases (e.g. and/or $Si_3N_4$), particle surface characteristics and uniformity, and that such chemical and physical properties are achieved by controlling the temperature, pressure, gaseous reactant conditions, reaction rates, flow rates, etc.

Liquid hydrazine in vessel 76 is vaporized in chamber 64 and introduced by line 56 into reactant mixing zone 28 of the reactor assembly 10 for admixing with silane introduced by line 46. The reactant mixture is passed through the tube bundle 30 and ignited by a high voltage electric spark produced by the ignition assembly 102. The flame may be operated over a pressure range of at least 0.01 to 5.0 atm., preferably at about atmospheric pressure. To produce powder with little free silicon, the gaseous reactants are mixed in a molar ratio of silane/hydrazine from 0.1 to 0.8, preferably 0.5. Unburned linear gas velocity through the burner is controlled at from 40 to 100 cm/s, with a preferred flow of approximately 75 cm/s.

A continuous flow of inert gas, such as nitrogen is introduced into the inert gas zone 40 and is passed through the annular chamber tube bundle 36 thereby to surround the flame. As inert liquid, e.g. 2,2,4-trimethylpentane containing a dispersant, e.g., 1-hydroxyethyl, 2-mixed heptadecenyl heptadecadienyl imidazoline, is sprayed from the nozzle 106 into the reaction products including thus formed ceramic powder. The powder/liquid mixture or slurry is collected in the lower portion 18 of the reactor assembly 10 for subsequent separation. The thus formed ceramic material, i.e. silicon nitride, is kept from contact with air since oxygen is an undesirable impurity in silicon nitride.

EXAMPLES

The following examples are illustrative of conditions for the process of the invention and it is to be understood that the scope of the invention is not to be limited thereby.

Example I

In a reactor assembly 10, premixed reactants are introduced and passed through the tube bundle 30 comprised of about 350 stainless steel tubes 32 (i.d.=0.08cm.) surrounded by annular tube array 36 (similar individual tubes) through which nitrogen is passed to form a shroud flowing at about the same rate as the reactant/product gases. The shroud flow served two purposes, i.e., to maintain integrity of the reactant product flow and to keep newly formed particles from reaching the wall 12 of the reaction assembly 10. Ignition is achieved with an electric spark. Particles are collected by spraying a liquid, e.g., a hydrocarbon such as isooctane, into the gas/particle flow downstream of the flame.

Collection of the particles using a liquid spray eliminates the pressure drop usually encountered when a filter is used, making the product easier to handle, while minimizing exposure to oxygen. Product is periodically removed from the reactor assembly 10 by opening the valve 20 at the bottom of the reactor assembly 10 to transfer the slurry into the tank 24 for subsequent separation.

Example II

Stable flames of $SiH_4/C_2H_2/N_2$ are ignited with equivalence ratios from 0.35 to 1.00 in the reactor assembly 10 of FIG. 1 with unburned gas velocities of from 24 to 37 cm/s. A ratio of $C_2H_2$ to $N_2$ of 1.0 is maintained. A steady, yellow-orange flame is observed which produced dark grey powders at low equivalence ratios and brown powders at higher equivalence ratios. Slurries are filtered and the solid product dried under vacuum. Fourier transform infrared (FTIR) analysis of a sample demonstrated a product containing Si-C bonds. Powders produced at $\phi=0.35$ and $\phi=1.0$ had nitrogen BET specific surface areas of 85 and 61 $m^2/g$, respectively. Equilibrium calculations yielded adiabatic flame temperatures of 2070 K. and 1855 K. with solid products of 65% B-SiC/35% carbon and 100% B-SiC (weight %) for the $\phi=0.35$ and $\phi=1.0$ cases, respectively.

Example III

A $SiH_4/C_2H_2$ flame is effected without a nitrogen diluent at $\phi=1.15$ and a 23 cm/s unburned gas velocity (a calculated flame temperature of 1875 K.) to produce a brown powder. A $\phi=1.0$ flame is ignited and then a nitrogen diluent flow increased until the flame became unstable and extinguished at a feed rate of $SiH_4/C_2H_2/N_2=80/40/220$ $cm^3/s$ with a final unburned gas velocity of 59 cm/s. The corresponding calculated flame temperature is 1370 K.

Example IV

In the reactor assembly 10 of Example 1, a reagent feed composition is made up of $SiH_4$, $N_2H_4$, $N_2$, and $NH_3$. Linear total unburned gas velocity is varied over a large range. Varying the feed composition, (i.e., equivalence ratio, amount of $N_2$, and amount of $NH_3$) varied the temperature of the flame; this variation is from less than 1000 K. (873 K.) to slightly greater than 2000 K. (adiabatic equilibrium flame temperatures) with a majority of flames in the 1100 to 1800 K. range. Flow velocities are varied from 30 to 141 cm/s. Solid product is collected at various times in sprays of water, hydrocarbon, or acetonitrile. Powders are prepared by filtering the powder/liquid slurries and drying the filter cake under vacuum or by heating. Most samples are handled in a nitrogen purged dry box (to reduce the $O_2$ exposure). Yields of silicon nitride as high as 92% of theoretical and rates of production as high as 10 g/min are obtained.

The silicon nitride powders produced in the above described flat flame ranged in color from pure white to slightly off-white to a bone color, depending on process conditions. Variations from white is assumed to result from very small concentrations of silicon. With excess silane, high temperature, and low total gas feed rates, a dark brown powder is produced, which analysis demonstrated to be comprised of mainly free silicon combined with some silicon nitride.

Properties of the white and bone colored powders are measured and analyzed. Approximate tap densities are 0.2 to 0.4 $g/cm^3$. The measured BET specific surface areas for powders produced under several conditions varied from about 50 to 150 $m^2/g$, with an average value of about 120 $m^2/g$. Intrinsic particle densities measured using a helium displacement pycnometer ranged from 2.4 for samples handled in water and air to about 3.0 $g/cm^3$ for samples collected in hydrocarbon and handled under nitrogen. This difference in densities is believed to be due to the presence of oxides, e.g., $SiO_2$ or $Si_2N_2O$, in the less dense samples. A sample with a surface area of 120 $m^2/g$, and an intrinsic density of 3 $g/cm^3$ has an equivalent sphere, average particle diameter of about 20 nm (as confirmed by electron micrographs).

Emission spectrographic analysis for metal impurities identified small concentrations of aluminum, iron, copper, and magnesium. The sum of metal impurity concentrations is less than 100 ppm. Not detected with a 10 ppm sensitivity were 17 other metals including chromium, nickel, zinc, lead, tin, and manganese. The probable sources of the copper and aluminum are the brass burner housing and the aluminum $N_2H_4$ vaporizer. While such levels qualify the product material as high purity, such impurities may be further reduced with improved materials of construction of the reactor assembly.

Analysis by X-ray diffraction indicated a pure white sample, collected dry but exposed to air, is amorphous and remained amorphous after annealing at 1750 K. in 1 atm. of argon for 20 min. FTIR analysis of this sample before and after annealing provided a spectrum which matched the spectrum obtained from a product of Vesar Manufacturing Inc., $\alpha$-$Si_3N_4$ ceramic whisker which was used as a standard (99% minimum purity). The coincidence of the peaks confirmed the product to be silicon nitride of about the same purity. X-ray analysis of another sample, annealed to 1870 K. in 340 atm of argon for 20 min, indicated 100%-phase silicon nitride (less than 1%-phase or free silicon).

Oxygen contents of several samples are measured using neutron activation analysis and showed approximately 3% oxygen on powders collected under hydrocarbon and filtered and dried in a nitrogen atmosphere dry box. Measured oxygen levels correspond to about 60% to 100% of a surface monolayer. The two main source of oxygen for samples handled under nitrogen are probably residual water in the anhydrous hydrazine, and slight air contamination in handling. Oxygen levels for samples collected in water and handled in air have been determined to be as great as 30 wt %. Both sources of contamination may be further reduced.

The dried white powder heated to 1275 K. showed no color or surface area change with less than 4% weight change. Pellets of dry powder (with no additives) pressed to 10,000 psi showed green densities of 25 to 35% of theoretical density (3.18 $g/cm^3$). At 25,000 psi, pellet densities of up to 40 to 45% of theoretical have been obtained.

The flame synthesis processes of the present invention are similar to laser driven systems in that they each react gas phase reagents to produce ceramic powders, such as silicon nitride or silicon carbide. Both processes may be applied to produce other material and can be operated over a wide range of pressures from subatmospheric to superatmospheric. Both systems raise reactants to a high temperature at rapid rates to produce very fine, spherical particles. Neither product should interact with a hot wall of the reactor assembly so that high purity products result provided high purity reagents are used.

The flame process of the present invention has the following advantages over the laser process:

1. No energy input is required and thus it is a less expensive system from the standpoint of capital investment, maintenance, and operating costs;

2. The synthesis systems are less complicated than the laser system and can be expected to be more reliable and easier to operate;

3. A one-dimensional flame, i.e., a flat flame, except for its edges, has a highly uniform temperature profile (and therefore a uniform reactant to product temperature-time history) so that the particle produced should have a uniform composition and size distribution;

4. Because of inherent uniformity across a flat flame, the process is very easily scaled; and 5. The flame is capable of greater production rates than laser drive process (there are size limitations in a laser system because laser absorption through the reaction gases limits the diameter of the system.

While the invention has been described in connection with several exemplary embodiments thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. A continuous process for producing a ceramic powder from a compound selected from the group consisting of silane and diborane and a gaseous reactant including a molecular form of carbon or nitrogen, which comprises:

(a) continuously admixing in a gaseous phase said compound and said gaseous reactant, said gaseous reactant capable of a self sustaining reaction with said compound;

(b) forming and continuously maintaining a stabilized flat flame of said admixture of step (a) thereby to produce uniform, very fine ceramic powder; and (c) recovering said ceramic powder under non agglomerating conditions during step (b).

2. The continuous process as defined in claim 1 wherein said ceramic powder is contacted with an inert liquid prior to step (c).

3. The continuous process as defined in claim 1 wherein said compound is vaporized prior to step (a).

4. The continuous process as defined in claim 1 wherein said admixture of step (a) is preheated prior to step (b).

5. The continuous process as defined in claim 1 and further including the step of igniting said admixture prior to step (b) to form said stabilized flat flame.

6. The continuous process as defined in claim 1 wherein a shroud of an inert gas is provided about said stabilized flat flame.

7. The process as defined in claim 1 wherein said stabilized flat flame is at a temperature of at least 900 K.

8. The process as defined in claim 1 wherein said stabilized flat flame is of a thickness of from 0.05 to 0.5 cm.

9. The process as defined in claim 1 wherein said compound is silane and said gaseous reactant is acetylene.

10. The process as defined in claim 1 wherein said compound is silane and said gaseous reactant in cyanogen.

11. The process as defined in claim 1 wherein said compound is silane and said gaseous reactant is ammonia.

12. The process as defined in claim 1 wherein said compound is silane and said gaseous reactant is hydrazine.

13. The process as defined in claim 1 wherein said gaseous reactant is a mixture of ammonia and hydrazine.

14. The process as defined in claim 1 wherein said compound is diborane and said gaseous reactant is hydrazine.

15. The process as defined in claim 1 wherein said compound is diborane and said gaseous reactant is acetylene.

* * * * *